United States Patent [19]

Lingren et al.

[11] Patent Number: 4,568,514
[45] Date of Patent: Feb. 4, 1986

[54] FISSION CHAMBER DETECTOR SYSTEM FOR MONITORING NEUTRON FLUX IN A NUCLEAR REACTOR OVER AN EXTRA WIDE RANGE, WITH HIGH SENSITIVITY IN A HOSTILE ENVIRONMENT

[75] Inventors: Clinton L. Lingren, San Diego; James F. Miller, Encinitas, both of Calif.

[73] Assignee: Gamma-Metrics, San Diego, Calif.

[21] Appl. No.: 525,158

[22] Filed: Aug. 22, 1983

Related U.S. Application Data

[62] Division of Ser. No. 280,335, Jul. 6, 1981.

[51] Int. Cl.⁴ .............................................. G21C 17/00
[52] U.S. Cl. ..................................... 376/255; 376/259
[58] Field of Search ................................. 376/255, 259

[56] References Cited

U.S. PATENT DOCUMENTS

| | | | |
|---|---|---|---|
| 3,312,813 | 4/1967 | Vincent et al. | 376/255 |
| 3,579,127 | 5/1971 | Thomas | 328/143 |
| 3,769,156 | 10/1973 | Brecy | 376/255 |
| 3,873,840 | 3/1975 | Ellis | 376/255 |
| 3,886,333 | 5/1975 | Cohn | 376/259 |
| 3,894,912 | 7/1975 | Cohn | 376/259 |
| 3,931,522 | 1/1976 | Rusch | 376/259 |
| 3,942,014 | 3/1976 | McDowell et al. | 376/259 |
| 4,060,716 | 11/1977 | Perkul et al. | 376/259 |
| 4,079,236 | 3/1978 | Graham et al. | 376/255 |
| 4,133,039 | 1/1979 | Eichenlaub | 376/255 |
| 4,186,048 | 1/1980 | Thomas | 376/255 |

Primary Examiner—Sal Cangialosi
Attorney, Agent, or Firm—Baker, Maxham, Callan & Jester

[57] ABSTRACT

A fission chamber detector system for monitoring neutron flux density in a nuclear reactor includes a preamplifier and signal conditioning unit for amplifying and conditioning neutron signal pulses produced by fission chamber detectors located adjacent the reactor core. The preamplifier and signal conditioning unit are located outside of the containment vessel for the reactor. The amplifier and signal conditioning unit amplify and condition the neutron signal pulses to provide signals that can be transmitted by twisted shielded pairs to a remotely located signal processing unit. The preamplifiers include an input stage that enables the preamplifiers to be controlled remotely to either pass or inhibit neutron signal pulses to an amplifier stage from the fission chambers, and to pass test signals to the amplifier stage.

3 Claims, 10 Drawing Figures

FISSION CHAMBER DETECTOR SYSTEM FOR MONITORING NEUTRON FLUX IN A NUCLEAR REACTOR OVER AN EXTRA WIDE RANGE, WITH HIGH SENSITIVITY IN A HOSTILE ENVIRONMENT

This is a division of application Ser. No. 280,335 filed July 6, 1981.

BACKGROUND OF THE INVENTION

The present invention generally pertains to fission chamber detection systems for monitoring neutron flux in a nuclear reactor, and is particularly directed to and providing high neutron signal sensitivity in a hostile environment.

A fission chamber detector is a type of neutron detector that is preferred for use in neutron flux monitoring systems because it has been proven to have a longer life and to be more reliable than other types of neutron detectors.

In a typical prior art fission chamber detector system for monitoring neutron flux in a nuclear reactor, a number of fission chambers are located inside a biological shield that surrounds the reactor core. Neutron signals produced in response to the detection of neutrons are transferred over conductors, such as coaxial cables to a preamplifier unit located inside a containment vessel for the reactor. The preamplifier unit amplifies the neutron signals for enabling further transmission via coaxial cables.

In prior art systems, the preamplifier units are located within the containment vessel for the nuclear reactor because in such prior art systems, the quality of the neutron signals would be so much diminished by electrical noise, attenuation, and signal reflection if the preamplifier units were located more than one hundred feet (thirty meters) from the neutron chambers that the sensitivity of the system would be impaired. The location of the preamplifier units within the containment vessel makes the preamplifier units susceptible to being rendered inoperable in the event that they are subjected to a hostile environment such as exists when the reactor suffers a loss of coolant accident. In the event of such an accident, the environment within the containment vessel is severely changed. Steam, boric acid, caustic sprays and other contaminants that are adverse to electrical circuits permeate the air, and the temperature and the air pressure increase to such an extent that preamplifier units in conventional containers would not withstand the increased temperature and would be damaged by such contaminants as penetrated the container under the conditions of increased pressure. Also the radiation level would increase to make the preamplifier units inoperative from the radiation damage. Yet, it is particularly important that neutron flux within the biological shield be monitored during and following a loss-of-coolant accident. This would require preamplifier units located within the containment vessel to be shielded from high radiation and temperature and to have containers that can withstand high pressure and be impermeable to contaminants. It is impractical and very expensive to meet this requirement.

SUMMARY OF THE INVENTION

The present invention is a fission chamber detector system for monitoring neutron flux in a nuclear reactor with high sensitivity in a hostile environment.

In one aspect of the invention the preamplifier and signal conditioning unit are located outside of the containment vessel, to enable and amplify and condition neutron signal pulses provided by fission chamber detectors located adjacent the reactor core transmission of the amplified and conditioned signals from the preamplifier and signal conditioning unit to a remotely located signal processing unit by twisted shield pairs rather than by more expensive coaxial cables as is done in prior art systems. This is possible because of the nature of the signal conditioning that is accomplished in the preamplifier and signal conditioning unit of this invention.

In another aspect of the present invention, the preamplifier and signal conditioning unit includes at least one preamplifier having an input stage that includes a semiconductor switching device having a gate terminal, an input terminal coupled to the coaxial cable for receiving neutron signal pulses from the fission chamber, and an output terminal coupled to an amplifier stage for providing the received neutron signal pulses to an amplifier stage in the preamplifier when the switching device is rendered conductive; and a control circuit connected to the switching device and having a control terminal for rendering the switching device conductive when a first predetermined voltage is applied to the control terminal and for inhibiting conduction by the switching device when a different second predetermined voltage is applied to the control terminal. The control circuit includes a conduction path from the control terminal to the amplifier stage.

In accordance with this aspect of the invention, a test signal generator is connected to the control terminal of the input stage for providing a test signal having a voltage level equal to or exceeding the second predetermined voltage for thereby inhibiting the semiconductor switching device from conducting and for providing the test signal to the amplifier stage for testing the operation of the monitoring system. Test signals can thereby be inserted for calibrating the monitoring system without the use of an electro-mechanical switch in the preamplifier and signal conditioning unit.

Additional features of the present invention are described in the description of the preferred embodiment.

DESCRIPTION OF THE PREFERRED EMBODIMENT

Figure 1:
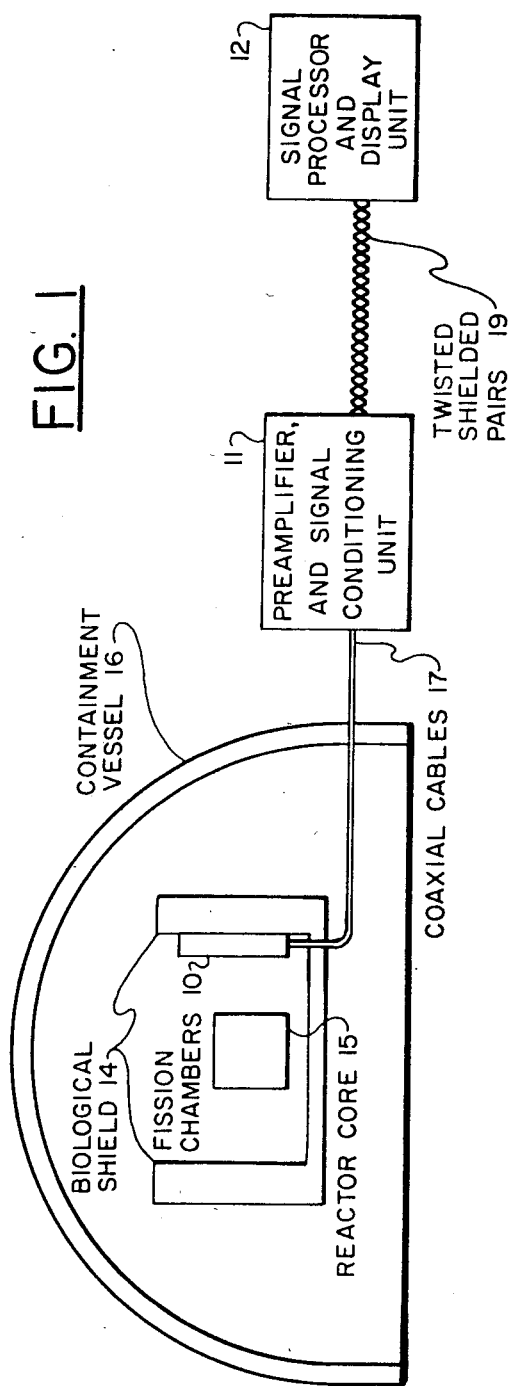
FIG. 1 is a diagram illustrating the location of the components of the system of the present invention.

Referring to FIG. 1, the preferred embodiment of the monitoring system of the present invention includes fission chamber detectors 10, a preamplifier and signal conditioning unit 11, and a signal processor and display unit 12. The fission chamber detectors are located inside the biological shield 14 that surrounds the reactor core 15. The preamplifier and signal conditioning unit 11 is located outside the containment vessel 16, usually within about five hundred feet (one hundred fifty meters) of the fission chambers 10. The preamplifier and signal conditioning unit 11 is connected to the fission chambers 10 by a plurality of coaxial cables 17. The signal processor and display unit 12 is located in a control room remote from the containment vessel and is connected to the preamplifier and signal conditioning unit by a plurality of twisted shielded pairs 19.

Figure 2:
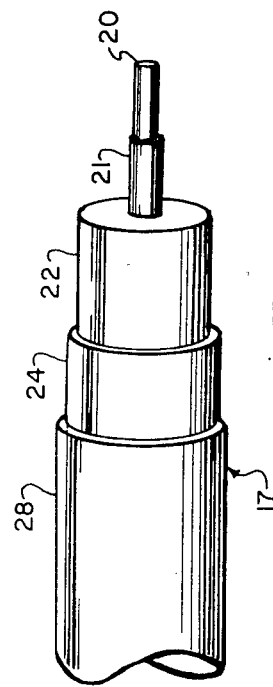
FIG. 2 is a view showing the unique construction of the coaxial cable used in the system of the present invention.

Each of the coaxial cables 17 is uniquely constructed for withstanding high pressure, high temperature and high nuclear radiation and for shielding against electrical noise. Referring to FIG. 2, each coaxial cable includes a center conductor 20 closely covered by a thin coaxial high temperature insulating layer 21, which in turn is closely covered by a relatively thick coaxial dielectric layer 22 for withstanding nuclear radiation. The dielectric layer is closely covered by a solid coaxial sheath layer 24 of a conductive metal, such as copper. Preferably, the solid sheath layer 24 is 14 mils (0.35 mm) thick bare copper that has an outside diameter of 0.25 inch (6.35 mm); the shielding layer 22 is cross-linked polyethelene for shielding against approximately $10^9$ rads of nuclear radiation; the insulating layer 21 is poly(amide-imide) for providing insulation against temperatures up to about 200 degrees Centigrade; and the center conductor is 12 AWG bare copper wire. This combination of materials also withstands such high pressures, temperature, and nuclear radiation as are likely to be encountered within the containment vessel 16 in the event of a loss-of-coolant accident. The cross-sectional area of the sheath layer 24 is similar to the cross-sectional area of the center conductor 20 and both have low resistance for reducing attenuation and increasing noise immunity.

Figure 3:
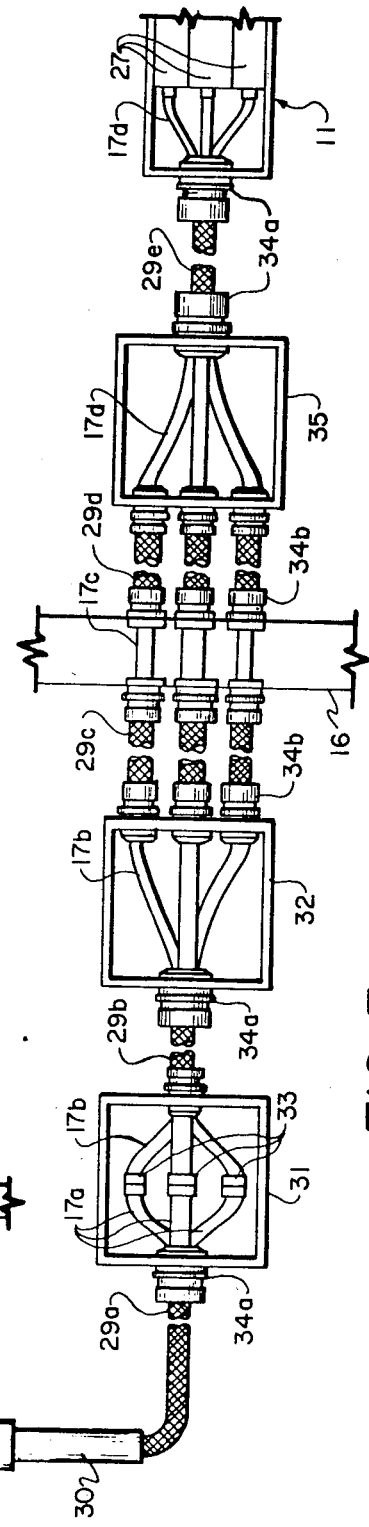
FIG. 3 is a schematic representation of the passage of the coaxial cables from the fission chambers to the preamplifier and signal conditioning unit and of the types of protection provided for the coaxial cables at different locations.

Referring to FIG. 3, all of the fission chambers 10 are contained in a single container 25. Coaxial cables 17a with coaxial connectors are individually connected to the respective coaxial connectors 51 of the fission chambers for conducting neutron signal pulses to preamplifiers 27 contained in the preamplifier and signal conditioning unit 11. The coaxial cables 17a are collected within a flexible metal hose 29a and passed through to a first junction box 31. The coaxial cables 17a are coupled to extended coaxial cables 17b by connectors 33 within the first junction box 31 so that if it is necessary to replace the coaxial cables 17a from within the biological shield 14, one will not necessarily have to replace any of the remaining coaxial cables 17b, 17c or 17d extending outward through the wall of the containment vessel 16 to the preamplifiers 27. The coaxial cables 17b extending outward from the first junction box 31 are also collected in a flexible metal hose 29b, which carries the coaxial cables 17b to a second junction box 32 adjacent the inside of the wall of the containment vessel 16.

Inside the second junction box 32, the coaxial cables 17b are separated and passed through separate flexible metal hoses 29c. The coaxial cables 17b and the flexible metal hoses 29c are connected to conductors 17c that penetrate the wall of the containment vessel 16. Such connection is by high pressure coaxial or triaxial connector fittings 34b. The conductors 17c continue through the wall of the containment vessel 16, and are connected to coaxial cables 17d that pass through separate flexible metal hoses 29b. The metal hoses 29d and the coaxial cables 17d are connected at the outside of the wall of the containment vessel 16 by high pressure coaxial or triaxial connector fittings 34b to the conductors 17c. The cables 17d pass into a third junction box 35 adjacent the outside of the wall.

The junction boxes 31, 32 and 35 are high pressure junction boxes and the fittings 34a used to connect the flexible metal hose 29a, 29b, 29c, 29d and 29e to the junction boxes are high pressure fittings. The junction boxes are sealed by materials for withstanding such levels of gamma radiation as would be expected to occur in the event of a loss-of-coolant accident. The metal hoses 29a, 29b, 29c, 29d and 29e protect the coaxial cables 17 and associated coaxial connectors from potentially destructive contaminants under high pressure. The metal pipe 30 provides structural support for the coaxial cables 17a and the flexible metal hose 29a to prevent flexure in the zone of high nuclear radiation.

Inside the third junction box 35, the coaxial cables 17b are again collected into a single flexible hose 29e, through which they pass to the inside of the preamplifier and signal conditioning unit 11, where they are separated and coupled to separate preamplifiers 27.

The solid sheath layer 24 (FIG. 2) is coaxially covered by an outer insulating layer 28 for electrically insulating the coaxial cables 17 (FIG. 3) from the metal hose 29. The outer insulating layer must be capable of withstanding high nuclear radiation and high temperature.

Figure 4:
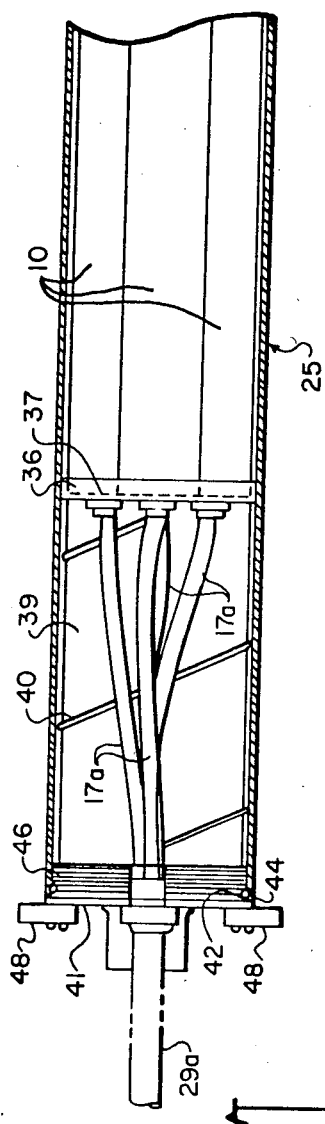
FIG. 4 illustrates the construction of a pressure-resistant container for the fission chamber detectors.

Referring to FIG. 4, the container 25 in which the fission chambers 10 are contained is a pressure-resistant cylindrical container. The fission chambers 10 are held in placed laterally by a spacer 36 having a shoulder 37 for engaging the chambers 10. The fission chambers 10 are held in place longitudinally by a spring 39 which consists of an aluminum cylinder, which has a wall thickness of 0.25 inch (0.62 cm) and a spiral groove 40 that is 0.125 inch (0.31 cm) wide. The fission chambers 10 are electrically insulated from the container 25.

The container 25 is sealed by an end cap 41. The end 42 of the container 25 is cut at an angle of 45 degrees. The end cap 41 has a side surface 44 that flares in at an angle of 45 degrees to mate with the end surface 42 of the container 25. The end cap 41 is threaded into the container 25 to provide a metal to metal seal between the end cap 41 and the container 25.

The pipe 30 (FIG. 3) is threaded into the end cap 41.

The container 25 is positioned vertically in a detector thimble (not shown) mounted inside the biological shield 14. The detector thimble diameter is different in different installations. The outside diameter of the container 25 is less than the inside diameter of the detector thimble. Adjustable wedges 48 are included on end cap 41 for wedging the container 25 within the detector thimble so that the container 25 remains stationary. The adjustable wedges 48 are eccentric cams.

Figure 5:
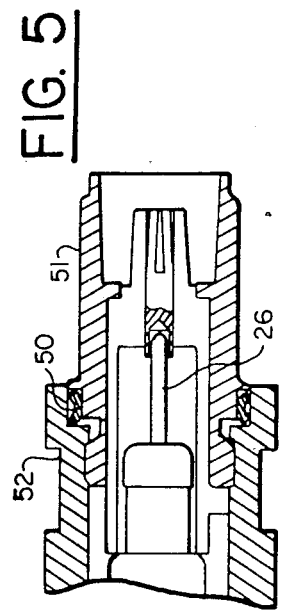
FIG. 5 illustrates how the coaxial connector of the fission chamber detector is tightly sealed to the body of the fission chamber.

Referring to FIG. 5, each fission chamber 10 is of standard construction except that the coaxial connector 51 is tightly sealed to the body 52 of the fission chamber 10 by a metal O-ring 50.

Figure 6:
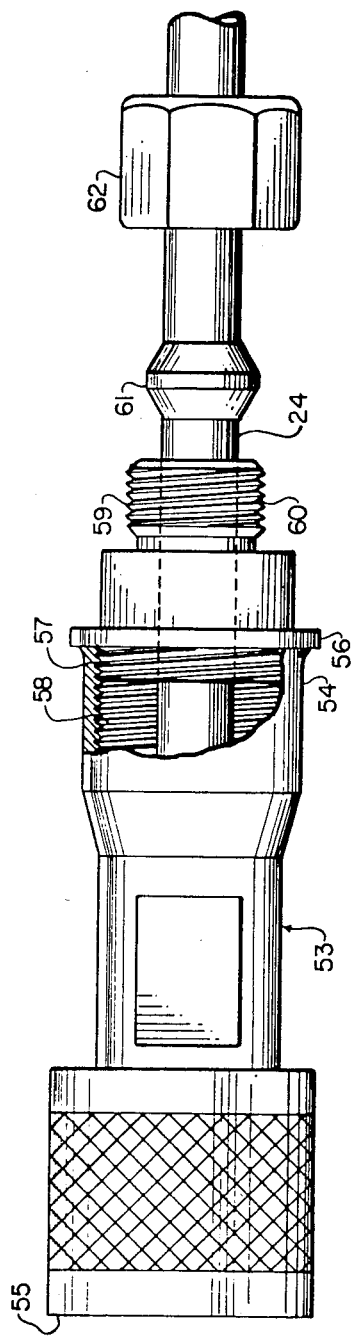
FIG. 6 illustrates one embodiment of the connection of a coaxial connector to the solid sheath of the coaxial cable.

FIG. 6 illustrates how the solid sheath 24 is tightly sealed to a standard coaxial cable connector 53. The connector 53 has a conductive body 54. One end 55 of the body 54 is adapted for connecting the center conductor 20 of the coaxial cable to another conductive element, such as an electrode, a terminal or another coaxial cable center conductor. Such construction is standard and need not be further discussed.

A special conductive adapter 56 is sealed to the other end of the connector body 54. The adapter has exterior threads 57 at one end which are tightly sealed to the interior threads 58 of the connector body 54. The conductive adapter 56 includes a bore 59 that closely fits around the solid sheath 24. The other end of the adapter 56 has exterior threads 60. A conductive ferrule 61 is closely fitted over the solid sheath 24 at the other end of the adapter 56. A nut 62 is screwed onto the exterior threads 60 of the adapter and pinches the ferrule 61 between the adapter 56 and the nut 62 to seal the solid sheath 24 to the conductive body 54 against the contaminants under high pressure.

Figure 7:
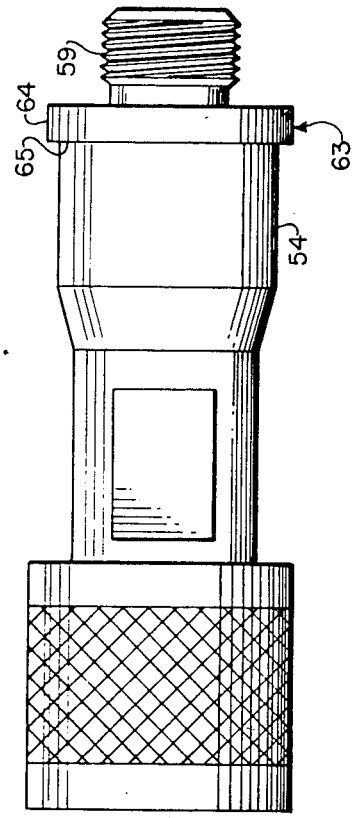
FIG. 7 illustrates an alternative embodiment of an adapter used for connecting a coaxial cable connector to the solid sheath of the coaxial cable.

FIG. 7 shows an alternative embodiment of a conductive adapter 63 for tightly sealing the solid sheath 24 to the conductive body 54 of a standard coaxial cable connector 53. The alternative adapter 63 has a flange 64 that is sealed to the end surface 65 of the connector body 54 by high temperature solder, brazing or welding. The adapter 63 does not have threads at the one end which engage the connector body 54, such as the threads 57 of the adapter 56 in the embodiment of FIG. 6. In other respects, the adapter 63 is identical to the adapter 56 and is connected to the solid sheath 24 in the same manner as the adapter 56.

Figure 8:
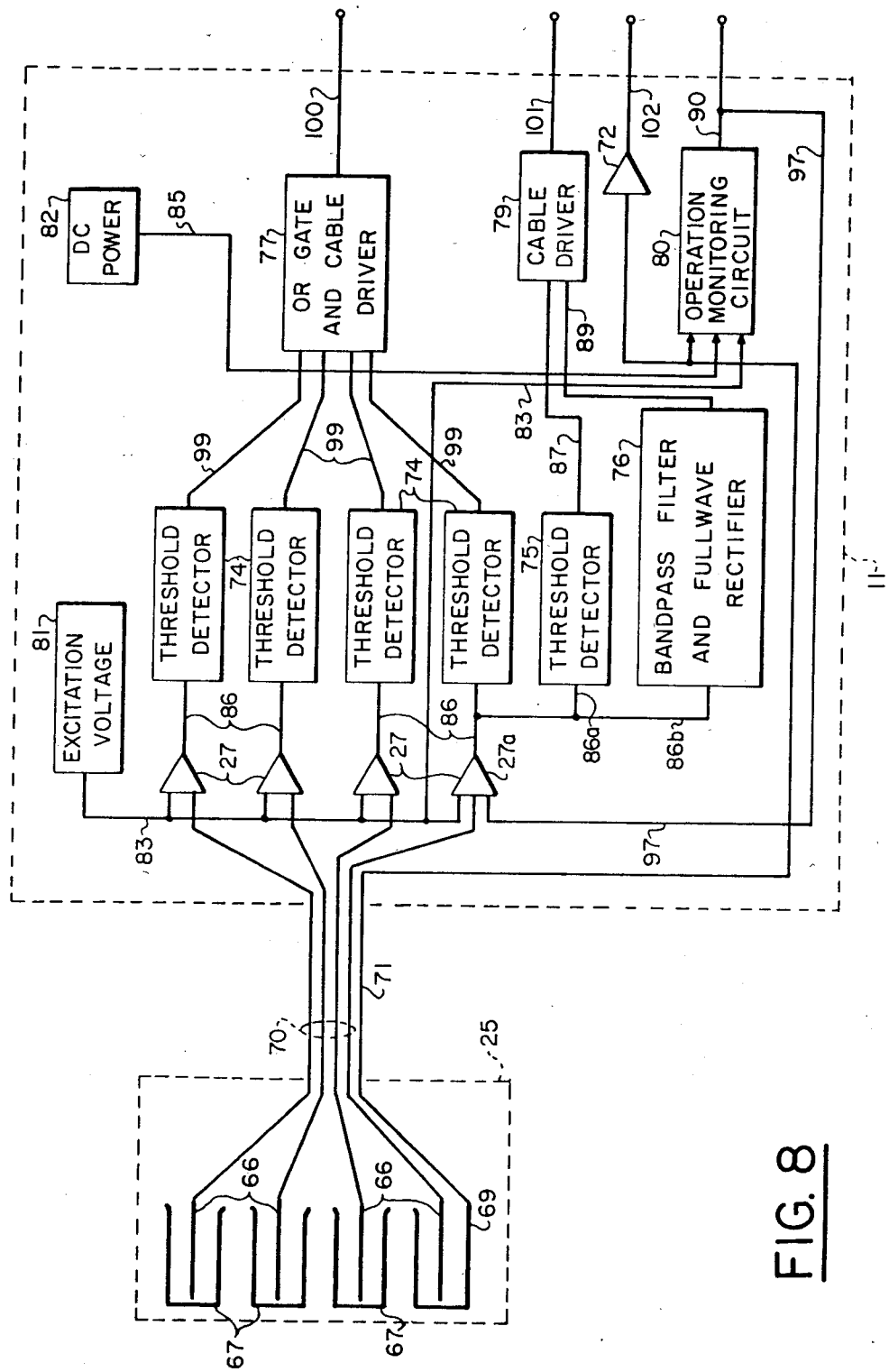
FIG. 8 is a block diagram of the preamplifier and signal conditioning unit and further includes the connections thereto from the fission chamber detectors.

The electronic circuit aspects of the monitoring system are described with reference to FIGS. 8, 9, and 10. Referring first to FIG. 8, within the fission chamber container 25, there are four fission chamber detectors, as symbolized by electrodes 66 and shields 67 and 69. The electrodes 66 of the fission chambers are respectively connected to the inputs of the preamplifiers 27. The outer electrode 69 of one of the fission chamber detectors is connected by a line 71 to a current amplifier 72 in the preamplifier and signal conditioning unit 11.

The preamplifier and signal conditioning unit 11 further includes four very sensitive threshold detectors 74, a less sensitive threshold detector 75, a band pass filter and full wave rectifier circuit 76, an OR gate and cable driver circuit 77, a second cable driver circuit 79, an operation monitoring circuit 80, an excitation voltage circuit 81, and a DC power supply circuit 82.

Figure 9:
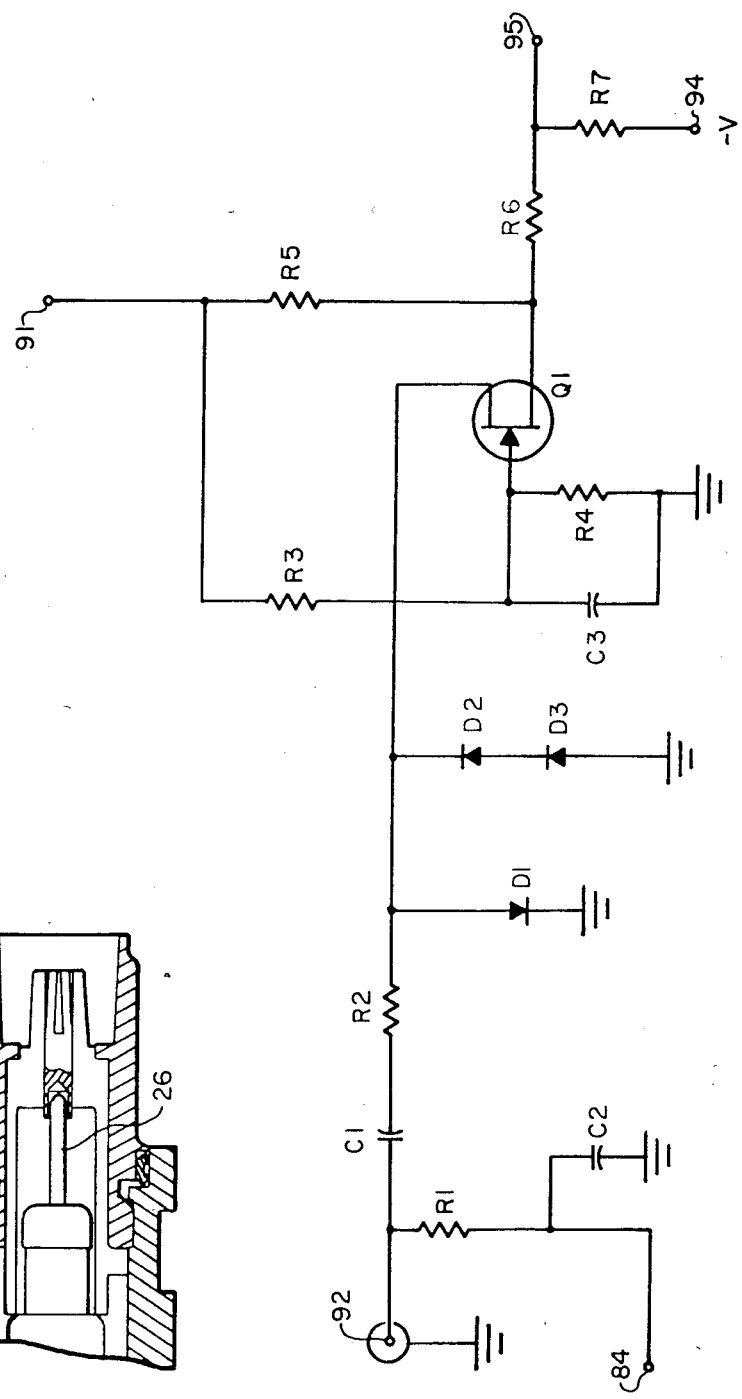
FIG. 9 is a schematic circuit diagram of an input stage in the preamplifiers included in the unit of FIG. 8.

The excitation voltage circuit 81 provides a high voltage signal on line 83 to a high voltage input terminal 84 of each of the preamplifiers 27, as shown in FIG. 9.

The DC power supply circuit 82 provides DC voltage supply signals to each of the other components of the unit 11 as required. It is adapted for connection to an AC line supply voltage power source. The output of the DC power supply circuit 82 are connected by line 85 to the operation monitoring circuit 80 so that the operation of the DC power supply 82 can be monitored. The power supply connections from the DC power supply 82 are not shown in the Drawing.

The output of each of the preamplifiers 27 is connected via lines 86 to the input of each of the very sensitive threshold detectors 74.

The output of each of the threshold detectors 74 are connected via the lines 99 to the input of the OR gate and cable driver circuit 77.

The output of the preamplifier 27a also is connected via line 86a to the input of the less sensitive threshold detector 75 and via line 86b to the input of the bandpass filter and fullwave rectifier circuit 76. The output of the less sensitive threshold detector 75 and the output of the bandpass filter and fullwave rectifier circuit 76 are respectively coupled by lines 87 and 89 to the input of the second cable driver circuit 79.

The operation monitoring circuit monitors an alpha current signal provided on line 71 from the fission chamber electrode 69, the high voltage signal on line 83 from the excitation voltage circuit 81 and the supply voltage signal on lines 85 from the DC power supply circuit 82. The output of the operation monitoring circuit 80 is connected via line 90 to an alarm device 93 as shown in FIG. 10. When the operation monitoring circuit 80 detects an irregularity in any of the signal on line 71 from the fission chamber outer electrode 69, the signal on line 83 from the excitation voltage circuit 91, or the signal on line 85 from the DC power supply circuit, the operation monitoring circuit 80 provides an alarm signal via line 90 to the alarm device 93 (FIG. 10).

FIG. 9 shows the detail of an input stage of the preamplifier circuit 27a. The input stage includes a control terminal 91, a coaxial cable input terminal 92, capacitances C1, C2 and C3, resistances R1, R2, R3, R4, R5, R6 and R7, protective diodes D1, D2 and D3 and a field effect transistor (FET) Q1.

The resistance R1 is connected between the high voltage input terminal 84 and the coaxial cable input terminal 92. The capacitance C1 and the resistance R2 are connected in series between the coaxial cable input terminal 92 and an input conduction terminal of the FET Q1. The capacitance C2 is connected between the high voltage input terminal 84 and circuit ground. The diode D1 is connected between the input conduction terminal of the FET Q1 and circuit ground for enabling conduction to circuit ground of a signal that is more than 0.7 volts above circuit ground. The diodes D2 and D3 are connected in series between the input conduction terminal of the FET Q1 and circuit ground for enabling conduction to circuit ground of a signal that is more than 1.4 volts below circuit ground. The resistance R3 is connected between the control terminal 91 and the gate of the FET Q1. The resistance R4 and the capacitance C3 are connected in parallel between the gate of the FET Q1 and circuit ground. The resistance R5 is connected between the control terminal 91 and the output conduction terminal of the FET Q1 and the resistance R6 is connected between the output conduction terminal of the FET Q1 and an input stage output terminal 95. The resistances R5 and R6 provide a conduction path from the control terminal 91 to the input stage output terminal 95. The resistance R7 is connected between the input stage output terminal 95 and a negative bias voltage terminal 94.

The resistance R1 and capacitance C2 are for filtering electrical noise from a high voltage signal applied to the terminal 84. The capacitance C1 is a coupling capacitance.

The protective diode D1 protects the preamplifier 27a against excessively large positive voltage excursions at the input terminal 92; and the protective diodes D2 and D3 protect the preamplifier against excessively large negative voltage excursions at the input terminal 92.

A negative bias voltage is applied to terminal 94. The values of the resistances R3, R4, R5, R6 and R7 are chosen to provide a control circuit for the FET Q1 such that when a first predetermined voltage signal is applied to the terminal 91, the FET Q1 is enabled to pass input neutron signal pulses received at the coaxial cable input terminal 92 onto the input stage output terminal 95; and such that when a higher second predetermined voltage signal is applied to the terminal 91, the FET Q1 is inhibited from conduction.

The preamplifier 27a further contains a high frequency current amplifier (not shown) which has an input transistor having its emitter connected to the output terminal 95 of the input stage shown in FIG. 9. The value of the resistance R2 in the input stage is chosen so that when the FET Q1 is on, the resistance of the series combination of the resistance R2, the resistance of the FET Q1, the resistance R6 and the resistance of the emitter of the input transistor in the high frequency current amplifier (not shown) matches the characteristic impedance of the coaxial cable connected to the coaxial cable input terminal 92. This reduces neutron signal reflection in the coaxial cable.

The control circuit for the FET Q1 also enables the FET Q1 to be inhibited from conducting neutron signal pulses received from a fission chamber detector 10 at the coaxial cable input terminal 92 when it is desired to provide a test signal to the preamplifier 27a. A test signal generator 96 is included in the signal processor and display unit 12 (FIG. 10) for providing a test signal via line 97 to the control terminal 91 of the input stage of the preamplifier 27a. The test signal generator 96 provides a test signal, having a voltage level equal to or exceeding the second predetermined voltage level required for inhibiting the FET Q1 from conducting. Accordingly, the input stage of the preamplifier 27a can be controlled remotely for inhibiting the passage of neutron signals received from a fission chamber 10 through the preamplifier 27a, and for enabling a test signal to be passed through the preamplifier 27a in lieu of the received signals. All of the preamplifiers 27 are constructed in the same manner as the preamplifier 27a.

However, in the preferred embodiment, only the preamplifier 27a has its control terminal 91 connected to the test signal generator 96.

Each of the preamplifiers 27 is packaged in a separate module and operates independently of the other preamplifiers; whereby if one preamplifier fails, the other preamplifiers 27 and the system continue to operate, and repairs can be made without having to disable the entire system.

Neutron signal pulses received by the preamplifiers 27 via the lines 70 from the fission chamber 10 are amplified to provide amplified pulses on the lines 86 to the very sensitive threshold detectors 74. The very sensitive threshold detectors 74 detect only those pulses on the lines 86 that exceed a predetermined low threshold and provide detected signals respectively containing a corresponding number of detected pulses on lines 99 to the OR gate and cable driver circuit 77. The OR gate and cable driver circuit 77 provides a high level pulsed digital signal on line 100 that is representative of multilevel neutron signal pulses received from the fission chamber detectors 10. As a result of such conditioning by the very sensitive threshold detectors 74 and the OR gate and cable driver circuit 77, the high level pulsed digital signal provided on line 100 can be transmitted to the remotely located signal processing and display unit 12 by twisted shielded pairs 19 (FIG. 1) rather than by more expensive coaxial cables, as is done in prior art systems.

The less sensitive threshold detector 75 is connected to the preamplifier 27a for detecting only those pulses on line 86a from the preamplifier 27a that exceed a higher second predetermined threshold and provides a second detected signal containing a corresponding number of detected pulses on line 87 to the cable driver circuit 79.

The bandpass filter and fullwave rectifier circuit 76 is connected to the preamplifier 27a for conditioning the amplified neutron signal pulses on line 86b to provide a conditioned mean voltage signal on line 89 that has a DC level that is proportional to the square root of reactor power. The line cable driver circuit 79 combines the signals on lines 87 and 89 to provide a combined signal on line 101. The combined signal includes high level digital pulses that are representative of high level neutron signal pulses received from a fission chamber detector 10, and a DC signal component derived from the conditioned mean voltage signal on line 86b that is proportional to the square root of reactor power. As a result of such conditioning by the less sensitive threshold detector 75, the bandpass filter and full wave rectifier circuit 76 and the cable driver circuit 79, the combined signal provided on line 101 can be transmitted to the remotely located signal processing and display unit 12 by twisted shield pairs 19 (FIG. 1).

The current amplifier 72 is connected to the fission chamber shield 69 for providing an amplified signal on line 102 that is representative of a direct current signal on line 71 from the fission chamber detector.

Figure 10:
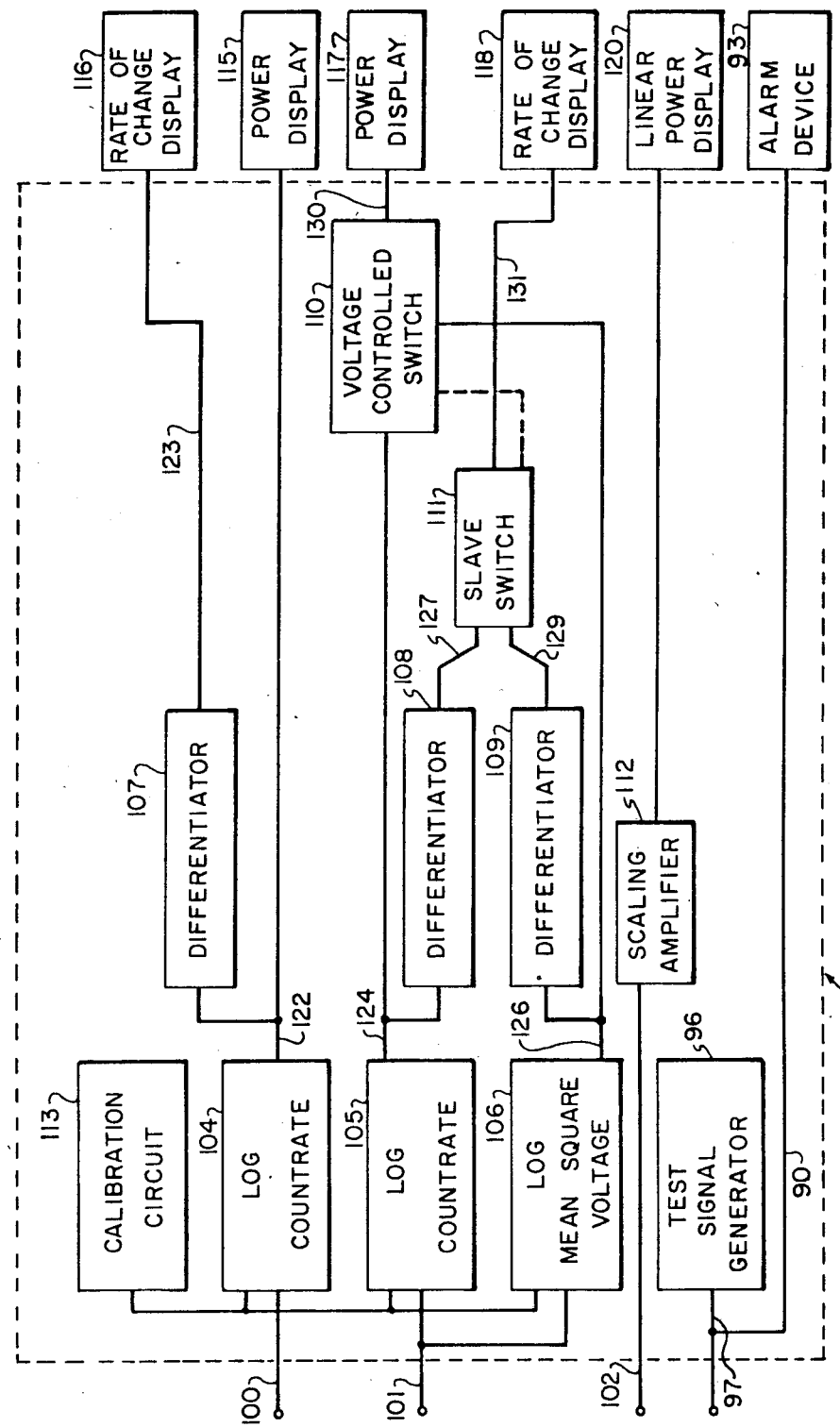
FIG. 10 is a block diagram of the signal processing and display unit.

Referring to FIG. 10, the signal processor and display unit 12 includes the test generator 96, a first log countrate circuit 104, a second log countrate circuit 105, a log mean square voltage circuit 106, first, second and third differentiators 107, 108 and 109, a voltage controlled switch 110, a slave switch 111, a scaling amplifier 112, a calibration circuit 113, a first reactor power display 115, a first reactor power rate-of-change display 116, a second reactor power display 117, a second reactor power rate-of-change display 118, a linear power display 120 and the alarm device 93.

The first log countrate circuit 104 processes the pulsed signal on line 100 to provide a first power signal on line 122 that is proportional to the logarithm of the rate of pulses in the pulsed signal on line 100. The signal on line 122 is proportional to the logarithm of reactor power in a first power range that includes power levels which prevail when the reactor is started. In this embodiment of the first power signal provided on line 122 represents reactor power in a first power range of from $10^{-12}$ to $10^{-6}$ times full reactor power. The power display 115 is connected to line 122 to display an indication of reactor power within this range.

The first differentiator 107 differentiates the first power signal on line 122 to provide a first rate-of-change signal on line 123 that is proportional to the rate of change of the logarithm of reactor power when reactor power is in the first power range. The first reactor power rate-of-change display 116 is connected to line 123 to display an indication of the rate of change of reactor power.

The second log countrate circuit 105 processes the combined signal on line 101 to provide a second power signal on line 124 that is proportional to the logarithm of the rate of pulses in the signal on line 101. The second power signal on line 124 is proportional to the logarithm of reactor power in a second power range of from $10^{-10}$ to $10^{-4}$ times full reactor power. At reactor power levels above this range, the pulses in the signal on line 101 occur at such frequency as to become indistinguishable. As a result, the log countrate circuit 105 is not capable of providing a meaningful output signal when the reactor power is above about $10^{-4}$ times full reactor power.

In order to measure reactor power above $10^{-4}$ times full reactor power, the log mean square voltage circuit 106 processes the DC signal component of the combined signal on line 101 to provide a third power signal on line 126 that is proportional to the logarithm of the voltage of the conditioned mean voltage signal on line 89. The third power signal on line 126 is proportional to the logarithm of reactor power in a third power range of from about $10^{-5}$ to 1 times full reactor power. This third power range includes the peak operating power of the reactor.

The second differentiator 108 differentiates the second power signal on line 124 to provide a second signal on line 127 that is proportional to the rate of change of the logarithm of reactor power when reactor power is in the second power range.

The third differentiator 109 differentiates the third power signal on line 126 to provide a third signal on line 129 that is proportional to the rate of change of the logarithm of reactor power when reactor power is in the third power range.

The reactor power ranges respectively represented by the first, second and third power signals on lines 122, 124 and 126 from the first log countrate circuit 104, the second log countrate circuit 105 and the log mean square voltage circuit 106 overlap. The calibration circuit 113 is connected to the first log countrate circuit 104, the second log countrate circuit 105 and the log mean square voltage circuit 106 for calibrating such circuits so that the power signals produced therefrom respectively on lines 122, 124 and 126 correspond in the overlapping portions of the respective power ranges.

The voltage-controlled switch 110 is connected to receive the second and third power signals from lines 124 and 126 and to pass the signals from line 124 onto output line 130 to the power display 117 when the voltage level of the signal on line 126 is less than a predetermined voltage that is representative of a reactor power level below the level at which the pulses on line 101 become so frequent as to become indistinguishable. When the voltage level of the signal on line 126 becomes equal to or exceeds such predetermined voltage, the voltage-controlled switch 110 passes the signals from line 126 onto the output line 130.

The slave switch 111 is connected to the voltage controlled switch 110 to switch between its input lines when the master voltage-controlled switch 110 switches between its input lines. Accordingly, the slave switch is connected to receive signals from lines 127 and 129 and to pass the signals from line 127 onto output line 131 to the rate of change display 118 when the voltage level of the signal on line 126 is less than the predetermined voltage, and to pass the signals from line 129 onto output line 131 to the rate-of-change display 118 when the voltage level of the signal on line 126 is equal to or exceeds the predetermined voltage.

As a result, the present invention provides simple alignment of the signals derived from pulse counting with the signals derived from the mean square voltage processing technique without incurring the spurious transients in the rate-of-change signals that were incident to the more complicated prior art alignment techniques.

The power display 117 is connected to line 130 to display an indication of reactor power within the range of from $10^{-10}$ to 1 times full reactor power.

The second reactor power rate-of-change display 118 is connected to line 131 to display an indication of the rate of change of reactor power.

The signal on line 102 is provided to the scaling amplifier 112; and the linear power display 120 is connected to the scaling amplifier 112 for displaying an indication of power.

We claim:

1. A system for monitoring neutron flux in a nuclear reactor, comprising
    a plurality of fission chamber detectors located adjacent the reactor core for providing neutron signal pulses in response to the detection of neutrons;
    a preamplifier and signal conditioning unit for amplifying and conditioning said neutron signal pulses; wherein the preamplifier and signal conditioning unit includes at least one preamplifier having an input stage comprising
    a semiconductor switching device having a gate terminal, an input terminal coupled to the coaxial cable for receiving neutron signal pulses from the fission chamber, and an output terminal coupled to an amplifier stage in the preamplifier for providing said received neutron signal pulses to the amplifier stage when the switching device is rendered conductive;
    a control circuit having a control terminal connected to the switching device for rendering the switching device conductive when a first predetermined voltage is applied to the control terminal and for inhibiting conduction by the switching device when a second predetermined voltage is applied to the control terminal, wherein the control circuit includes a conduction path from the control terminal to the amplifier stage; and
    a test signal generator connected to the control terminal of the input stage of the one preamplifier, for providing a test signal having a voltage level equal to or exceeding the second predetermined voltage for thereby inhibiting the semiconductor switching device from conducting and for providing the test signal to the amplifier stage for testing the operation of the monitoring system.

2. A system of monitoring neutron flux in a nuclear reactor, comprising
    a plurality of fission chamber detectors located adjacent to the reactor core for providing neutron signal pulses in response to the detection of neutrons;
    a preamplifier and signal conditioning unit for amplifying and conditioning said neutron signal pulses to provide amplified and conditioned signals that can be transmitted by twisted shielded pairs to a remotely located signal processing unit;

a remotely located signal processing unit for processing the amplified and conditioned signals to provide an indication of reactor power; and twisted shielded pairs for conducting said amplified and detected signals from the preamplifier and signal conditioning unit to the signal processing unit.

3. A system according to claim 2, wherein the conditioning means include a plurality of first threshold detectors respectively coupled to the fission chamber detectors for detecting neutron signal pulses exceeding a first predetermined threshold and for providing detected signals respectively containing a corresponding number of detected pulses from each of the first threshold detectors;

means coupled to the first threshold detectors for adding the detected signals from the first threshold detectors and for providing a first pulsed digital signal that is representative of multi-level neutron signal pulses received from the fission chamber detectors;

a second threshold detector coupled to one of the fission chamber detectors for detecting neutron signal pulses exceeding a second predetermined threshold that is higher than the first predetermined threshold and for providing a second detected signal containing a corresponding number of detected pulses;

second conditioning means coupled to the one fission chamber detector for conditioning the neutron signal pulses to provide a conditioned mean voltage signal having a D.C. level that is representative of reactor power; and means connected to the second threshold detector and the second conditioning means for combining the second detected signal and the conditioned mean voltage signal to provide a combined signal having digital pulses that are representative of the neutron signal pulses that exceed the second predetermined level and a D.C. signal component that is representative of reactor power.

* * * * *